(12) United States Patent
Jacobs et al.

(10) Patent No.: US 7,994,600 B2
(45) Date of Patent: Aug. 9, 2011

(54) ANTIREFLECTIVE COATING

(75) Inventors: Simon Joshua Jacobs, Lucas, TX (US);
Duane Scott Dewald, Dallas, TX (US);
Leigh A. Files, Richardson, TX (US);
Terry A. Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 920 days.

(21) Appl. No.: 11/314,772

(22) Filed: Dec. 21, 2005

(65) Prior Publication Data

US 2007/0141737 A1   Jun. 21, 2007

(51) Int. Cl.
*H01L 31/0216* (2006.01)
(52) U.S. Cl. ............ 257/437; 257/E31.119; 257/E31.12
(58) Field of Classification Search ................. 257/437, 257/E31.119, E31.12; 438/72
See application file for complete search history.

(56) References Cited

U.S. PATENT DOCUMENTS

| | | | |
|---|---|---|---|
| 5,091,244 A * | 2/1992 | Biornard | 428/216 |
| 6,232,002 B1 * | 5/2001 | Early et al. | 428/698 |
| 6,282,010 B1 * | 8/2001 | Sulzbach et al. | 359/249 |
| 6,689,682 B1 | 2/2004 | Ogle et al. | |
| 2001/0031365 A1 * | 10/2001 | Anderson et al. | 428/432 |
| 2003/0092258 A1 * | 5/2003 | Leng | 438/636 |
| 2004/0136044 A1 * | 7/2004 | Miller et al. | 359/223 |
| 2007/0122077 A1 * | 5/2007 | Bellman et al. | 385/37 |

OTHER PUBLICATIONS

Pampalone et al., Improved Photoresist Patterning over Reflective Topographies Using Titanium Oxynitride Antireflection Coatings, Apr. 1989, J. Electrochem. Soc., vol. 136, No. 4, pp. 1181-1185.*
Hyatt et al., Effect of an Increase in the Nitrogen Content of the Working Gas on the Microstructure of Reactive Sputtered TiN Thin Films, 1992, J. of Materials Science: Materials in Electronics, 3, pp. 41-47.*

* cited by examiner

*Primary Examiner* — Allan R Wilson
(74) *Attorney, Agent, or Firm* — Charles A. Brill; Wade James Brady, III; Frederick J. Telecky, Jr.

(57) ABSTRACT

Device and method for an antireflective coating to improve image quality in an image display system. A preferred embodiment comprises a first high refractive index layer overlying a reflective surface of an integrated circuit, a first low refractive index layer overlying the first high refractive index layer, a second high refractive index layer overlying the first low refractive index layer, and a second low refractive index layer overlying the second high refractive index layer. The alternating layers of high refractive index material and low refractive index material form an optical trap, allowing light to readily pass through in one direction, but not so easily in a reverse direction. The dual alternating layer topology improves the antireflective properties of the antireflective layer and permits a wide range of adjustments for manipulating reflectivity and color point.

24 Claims, 4 Drawing Sheets

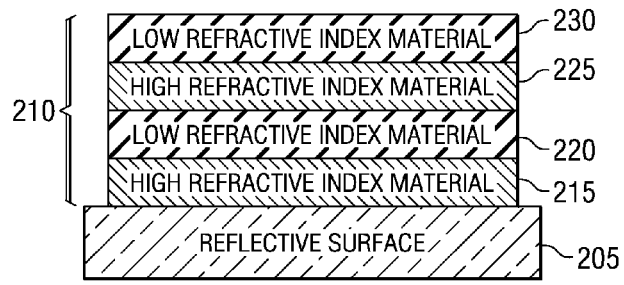
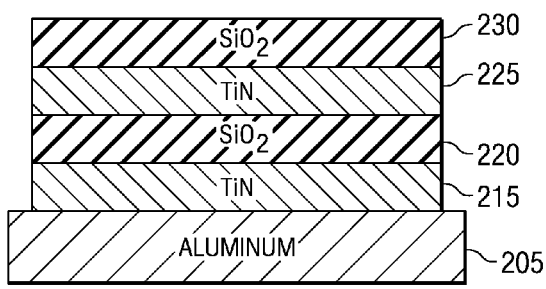
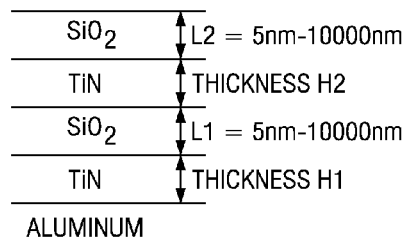
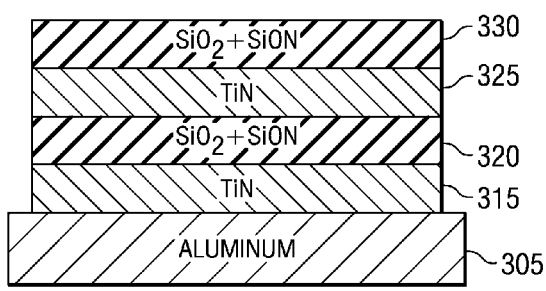
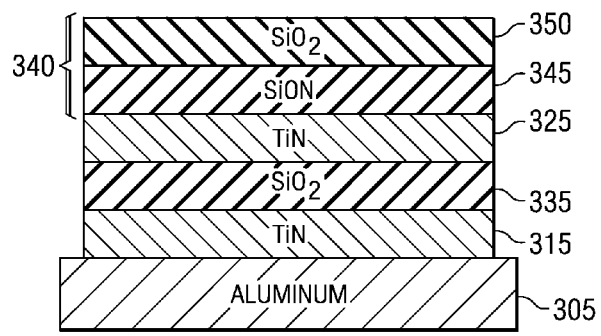

ANTIREFLECTIVE COATING

TECHNICAL FIELD

The present invention relates generally to a device and method useful in an image display system, and more particularly to a device and method for an antireflective coating to improve image quality in an image display system.

BACKGROUND

Image display systems that employ image projection techniques, such as spatial light modulators (SLMs) using arrays of digital micromirror devices (DMDs), deformable mirrors, and liquid crystal on silicon, can suffer from a degraded contrast ratio (a ratio of brightest white to darkest black producible) due to reflections of a light used to project the images from parts of the arrays not intended to reflect light. Light can scatter from support structures, apertures, vias, and so forth from the array of light modulators. The scattered light can effectively reduce the darkness of the darkest black, therefore reducing the contrast ratio. For example, in an SLM using DMD technology, light can scatter from electrode structures, micromirror support structures, mirror vias, and so on.

One technique to reduce reflection is to place an antireflective coating on metal structures in the array of light modulators. Since the metal structures can be a significant source of unintended reflection, the use of the antireflective coating can significantly improve the contrast ratio. For example, uncoated aluminum can have a reflectivity as high as 92 percent while coated aluminum can have a reflectivity of approximately two to three percent.

One disadvantage of the prior art is that the application of the antireflective coating on the metal structures does not address the unintended reflection from other portions of the array of light modulators, such as the interlayer dielectrics, the substrate material, metal structures buried under dielectric layers, and so forth.

A second disadvantage of the prior art is that by not addressing the light reflecting off the non-metallic structures, it is possible to have an undesired change in the color point by using different layer thicknesses. Changes in the thicknesses of the interlayer dielectric layers can have an especially pronounced effect upon the color point. Changing the color point can result in an undesired colorcast to the images being displayed.

SUMMARY OF THE INVENTION

These and other problems are generally solved or circumvented, and technical advantages are generally achieved, by preferred embodiments of the present invention which provide a device and method for an antireflective coating to improve image quality in an image display system.

In accordance with a preferred embodiment of the present invention, a semiconductor device with an antireflective coating is provided. The semiconductor device includes a first high refractive index layer overlying a reflective surface of an integrated circuit and a first low refractive index layer overlying the first high refractive index layer. The semiconductor device also includes a second high refractive index layer overlying the first low refractive index layer and a second low refractive index layer overlying the second high refractive index layer.

In accordance with another preferred embodiment of the present invention, a method for forming an antireflective coating on a semiconductor device is provided. The method includes forming a first high refractive index layer on a reflective surface and forming a first low refractive index layer on the first high refractive index layer. The method also includes forming a second high refractive index layer on the first low refractive index layer and forming a second low refractive index layer on the second high refractive index layer.

In accordance with another preferred embodiment of the present invention, an integrated circuit is provided. The integrated circuit includes a first layer overlying integrated structures of the integrated circuit, the first layer comprising a first material with a high refractive index and a second layer overlying the first layer, the second layer comprises a second material with a low refractive index. The integrated circuit also includes a third layer overlying the second layer, the third layer comprises a third material with a high refractive index and a fourth layer overlying the third layer, the fourth layer comprises a fourth material with a low refractive index.

An advantage of a preferred embodiment of the present invention is that it also reduces unintended reflections from the non-metallic portion of the array of light modulators, as well as reflections from structures that are buried underneath the dielectric layers. The result is a display system with a better contrast ratio, and hence, better quality images.

A further advantage of a preferred embodiment of the present invention is that the color point can be stabilized so that there is substantially no undesired colorcast to the images being displayed, even if the manufacturing process introduces wide variations in the thicknesses of the interlayer dielectric layers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a through 2c are diagrams of an antireflective coating for structures in an integrated circuit, according to a preferred embodiment of the present invention;

FIGS. 3a and 3b are diagrams of antireflective coatings, according to a preferred embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an SLM system using digital micromirror devices (DMDs) as light modulators, wherein the SLM system can make use of any number of light component colors. The invention may also be applied, however, to other SLM systems, such as those using deformable mirror or liquid crystal on silicon light modulators, as well as other applications where there is a need to reduce unintended reflections. Examples of these applications include light modulators used in non-display applications, including displacement monitors, accelerometers, photolithography, and so forth, as well as microelectromechanical (MEM) devices used, for example, in laser pointers.

Figure 1A:
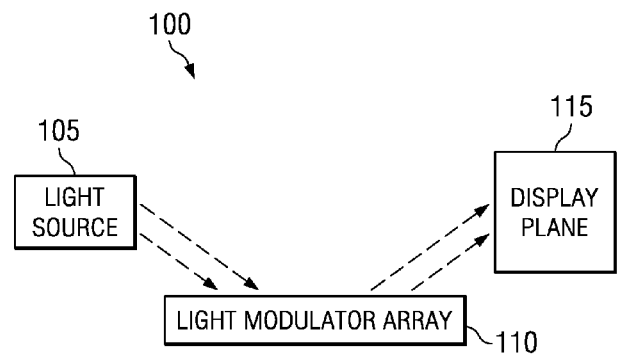
FIGS. 1a and 1b are diagrams of an SLM system and a detailed view of a cross-section of a light modulator array.

With reference now to FIG. 1a, there is shown a diagram illustrating an SLM system 100. The SLM system 100 features a light source 105 that provides light to a light modulator array 110. The light modulator array 110 contains a plurality of light modulators (not shown) that manipulate the light to display an image on a display plane 115. The light modulators in the light modulator array 110 can make use of a wide variety of light modulator technologies, such as positional micromirror, deformable mirror, liquid crystal on silicon, and so forth. For discussion purposes, the focus will be placed upon positional micromirrors used in a digital micromirror device (DMD). However, this should not be construed as being limiting to the spirit and scope of the present invention.

Depending upon a positional micromirror's position, light from the light source 105 can either reflect onto the display plane 115 or to some other portion of the SLM system 100. The light reflecting onto the display plane 115 forms the image being displayed and the light reflecting to another portion of the SLM system 100 is not visible on the display plane 115. Therefore, the state of picture elements can be displayed. If a picture element (or a group of picture elements) is to be on, then a positional micromirror(s) associated with the picture element will reflect light from the light source 105 onto the display plane 115 and the portion of the display plane 115 will be lit. On the other hand, if the picture element is to be off, then the positional micromirror will reflect light from the light source 105 to a different portion of the SLM system 100 and the portion of the display plane 115 will be dark.

However, light from the light source 105 can reflect from structures on the light modulator array 110 other than the light modulators themselves. This unintended reflection can have a negative effect on the SLM system's contrast ratio, thereby reducing overall image quality. For example, it is possible for light to reflect from apertures, vias, support structures, electrode structures, micromirror supports, and so forth on and in the light modulator array 110.

Figure 1B:
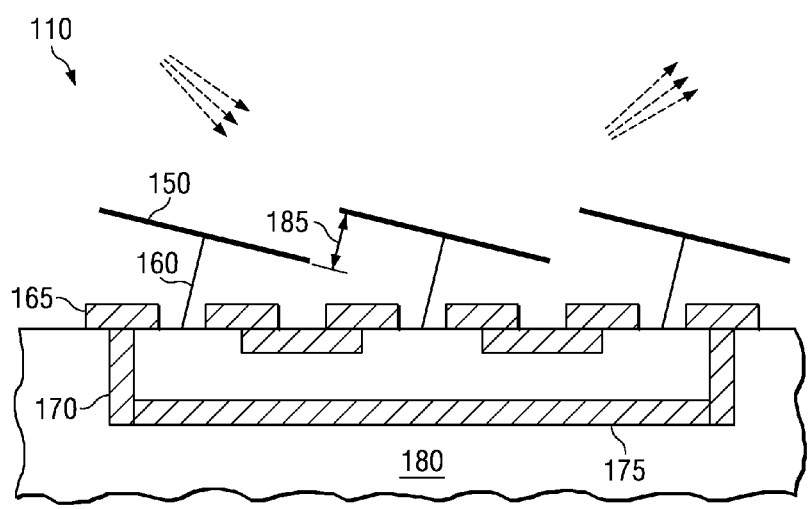

With reference now to FIG. 1b, there is shown a diagram illustrating a detailed view of a portion of the light modulator array 110, wherein positional micromirrors are used as light modulators. The diagram illustrates a portion of the light modulator 110 with three positional micromirrors, such as positional micromirror 150. The diagram also illustrates other structures making up the light modulator array 110, such as a positional micromirror structure 160, electrode structure 165, and so forth. Additionally, there can be structures such as vias 170, metal conductors 175, and so on buried beneath or in a modulating layer 180. It is possible for light from the light source 105 to travel through gaps, such as gap 185, present between adjacent positional micromirrors and strike these structures (as well as a top surface of the modulating layer 180) and scatter. The light from the unintended reflections can strike the display plane 115, degrading the contrast ratio of the SLM system.

As discussed previously, a prior art technique makes use of an antireflective coating applied to metal structures that are external to the modulating layer 180. A similar term, antireflective layer, can be used interchangeably with antireflective coating without affecting the spirit of the present invention. The antireflective coating can reduce the amount of unintended reflection. However, the application of the antireflective coating on the external metal structures does not address reflections from structures buried under the modulating layer 180 or undesirable scatter from the top surface of the modulating layer 180. Furthermore, a problem with color point variation as a function of varying layer thicknesses of an interlayer dielectric used to provide passivation to the modulating layer 180, which can lead to undesirable colorcast being present in images displayed by the SLM system, is not addressed in the use of the antireflective coating on the external metal structures. According to a preferred embodiment of the present invention, it is possible to apply an antireflective coating underneath the top surface of the modulating layer 180 so that reflections from structures buried under the modulating layer 180 can be reduced as well as providing a stable color point for widely varying interlayer dielectric thicknesses.

With reference now to FIGS. 2a through 2c, there are shown diagrams illustrating an antireflective coating that can be applied to a reflective surface to reduce reflectivity and an exemplary antireflective coating applied on a metallic surface, according to a preferred embodiment of the present invention. The diagram shown in FIG. 2a illustrates reflective surface 205, such as a metal structure, and an antireflective layer 210 that can be applied on top of the reflective surface 205. Alternatively, rather than applying the antireflective layer 210 on individual structures, the antireflective layer 210 can be applied on top of an entire layer. For example, if a modulating layer, such as the modulating layer 180 (FIG. 1b), has metal layers one, two, and three (with metal layer three being a topmost metal layer), then the antireflective layer 210 can be applied on top of the modulating layer after metal structures are formed in the metal layer three. The antireflective layer 210 can then cover the entire modulating layer and can reduce reflections from all structures in and beneath the modulating layer.

According to a preferred embodiment of the present invention, the antireflective layer 210 comprises four layers of material with differing refractive indices, with alternating layers of high refractive index material and low refractive index material. More than four layers can be used, however, the effectiveness of the antireflective layer 210 may not increase significantly with additional layers. Preferably, a first layer 215 of the antireflective layer 210 has a high refractive index. For example, the first layer 215 can be formed using TiN (titanium nitride) or silicon rich nitride (SiRN). A second layer 220 of the antireflective layer 210 should have a low refractive index and can be formed from a dielectric metal oxide, such as silicon dioxide ($SiO_2$), aluminum oxide ($Al_2O_3$), or silicon oxynitride (SiON). A third layer 225 of the antireflective layer 210 should have a high refractive index and can be formed using the same material as was used to form the first layer 215. Alternatively, a different material may be used in the third layer 225. A fourth layer 230 of the antireflective layer 210 should have a low refractive index and can be formed using the same material as was used to form the second layer 220. Alternatively, a different material may be used in the fourth layer 230. Depending upon the material used for the fourth layer 230, a passivation layer may be applied to provide a measure of protection for the antireflective layer 210 and underlying structures. For example, if silicon dioxide is used to form the fourth layer 230, it may not be necessary to add a passivation layer.

It should be understood to those skilled in the art of semiconductor manufacturing that the stoichiometry of these layers may not be exact. Thus in addition to the nominal compositional elements, amounts of other elements may be present. For example, in the case of titanium nitride, commonly denoted TiN, the stoichiometric, crystalline compound is $Ti_3N_4$. However, a titanium nitride thin film is better represented as $Ti_xN_yO_z$, where x, y, and z are integer values and y>x>z. This is due to the deposition method for the TiN layer, which typically involves reactive sputtering of Ti metal in a nitrogen-containing plasma.

The layers in the antireflective layer 210 effectively function as a light trap to prevent light that passes through the antireflective layer 210 and reflects from the reflective surface 205 from passing back through the antireflective layer 210. The thicknesses of the layers in the antireflective layer 210 can be determined after considering factors such as: wavelength of the light being reflected, desired color point, amount of permissible reflection, and so forth.

The diagram shown in FIG. 2b illustrates an exemplary antireflective coating formed from four layers of materials with differing refractive indices, wherein the antireflective coating is formed on top of the reflective surface 205 made of aluminum. The first layer 215 of the antireflective coating can be made using TiN (with a typical refractive index of around 2.5), the second layer 220 of the antireflective coating can be made using $SiO_2$ (with a typical refractive index of around 1.4) or SiON (with a typical refractive index of around 1.6), the third layer 225 of the antireflective coating can be made using TiN, and the fourth layer 230 of the antireflective coating can be made using $SiO_2$. Although shown in FIG. 2b as being made from TiN, the high refractive index layers, the first layer 215 and the third layer 225, can also be made from semiconducting metals, a metal oxide, or a metal nitride with a refractive index of at least 1.7. The thicknesses of the low refractive index layers (the second layer 220 and the fourth layer 230) can be referred to as thicknesses L1 and L2 and can range from 3 nm (nanometers) to 10,000 nm, with a preferred thickness range being 10 nm to 2,500 nm. While a preferred low refractive index material is $SiO_2$ or SiON, a wide variety of materials with a refractive index between that of air and TiN can be used, for example, insulating metal oxides and metal halides with a refractive index of less than 1.7 can be used. Additionally, materials such as aluminum (Al); titanium (Ti); tantalum (Ta); tungsten (W); silicon (Si); chromium (Cr); alloys of Al, Ti, Ta, W, Si, Cr; silicon dioxide ($SiO_2$); silicon oxynitride (SiON); titanium nitride (TiN); titanium aluminum nitride (TiAlN), and titanium dioxide ($TiO_2$), with TiN, TiAlN, and TiO2 being exemplary members of compounds describable as semiconductive binary and ternary compounds, can also be used. The two high refractive index layers (the first layer 215 and the third layer 225) can have thicknesses (referred to as thicknesses H1 and H2) chosen to minimize the intensities of undesired reflections from the completed structure. Layer thicknesses for H1 and H2 range from 5 nm to 1000 nm, and preferably from 5 nm to 250 nm. The diagram shown in FIG. 2c illustrates thickness ranges for the layers of the antireflective coating.

The dual high refractive index layers (the first layer 215 and the third layer 225), shown in FIG. 2b as being made from TiN, are arranged in what is commonly referred to as a split layer geometry. Each of the two high refractive index layers has a low refractive index antireflective coating. For example, the first layer 215 has the second layer 220 as its antireflective coating and the third layer 225 has the fourth layer 230 as its antireflective coating. The split layer geometry can be recognized by those of ordinary skill in the art of the present invention as being an optical trap.

An exemplary preferred embodiment of the present invention includes a first high refractive index layer with a thickness of approximately 20 nm of TiN, a first low refractive index layer with a thickness of approximately 50 nm of $SiO_2$, a second high refractive index layer with a thickness of approximately 20 nm of TiN, and a second low refractive index layer formed from two layers of low refractive index material, a first layer with a thickness of approximately 50 nm of SiON and a second layer with a thickness of approximately 900 to 1100 nm of $SiO_2$. A second exemplary preferred embodiment of the present invention includes a first high refractive index layer with a thickness of approximately 50 nm of TiN, a first low refractive index layer with a thickness of approximately 800 to 1100 nm of $SiO_2$, a second high refractive index layer with a thickness of approximately 75 nm of TiN, and a second low refractive index layer with a thickness of approximately 67 nm of SiON.

According to a preferred embodiment of the present invention, a difference in the refractive index of the material used in the high refractive index layer and the refractive index of the material used in the low refractive index layer for light in the visible spectrum should be at least 0.25. Furthermore, the material used in the high refractive index layer can be a semiconducting metal, a metal oxide, or a metal nitride with a refractive index of at least 1.7 for light in the visible spectrum. Additionally, the material used in the low refractive index layer can be made from one or more insulating metal oxides or metal halides with a refractive index of at most 1.7 for light in the visible spectrum.

With reference now to FIGS. 3a and 3b, there are shown diagrams illustrating alternate layer arrangements for the antireflective coating, according to a preferred embodiment of the present invention. Each of the two low refractive index layers (the second layer 220 and the fourth layer 230 of FIG. 2a) of the antireflective layer can comprise multiple layers of low refractive index materials, such as combinations of layers of $SiO_2$ and SiON. The diagram shown in FIG. 3a illustrates an antireflective coating on an aluminum layer 305 comprising two TiN layers 315 and 325 (high refractive index layers) alternating with two combination low refractive index layers 320 and 330 made up of two or more layers of $SiO_2$ and SiON. According to a preferred embodiment of the present invention, the combination low refractive index layers 320 and 330 can have similar thickness ranges (5 nm to 10000 nm with a preferred thickness range of 10 nm to 2500 nm) as the single material low refractive index layers 220 and 230 (FIGS. 2a and 2b), with the number of alternating layers and their respective thicknesses being based upon factors such as desired color point, reflectivity, and so forth. In addition to $SiO_2$ and SiON, other low refractive index materials can be used.

With reference now to FIG. 3b, in addition to the embodiment discussed above, wherein the two low refractive layers 320 and 330 are made from alternating layers of low refractive index materials, it is also a preferred embodiment that a first low refractive index layer, such as a first low refractive index layer 340 of two low refractive index layers be made from alternating layers of low refractive index materials, while a second low refractive index layer, such as second low refractive index layer 335, be made from a single low refractive index material or vice versa. As shown in FIG. 3b, the first low refractive index layer 340 is formed with two layers made from two low refractive index materials, a first layer 345 made from SiON and a second layer 350 made from $SiO_2$. Although shown as being formed with two alternating layers of low refractive index material, more than two alternating layers can be used. Furthermore, it is possible to form the low refractive index layer 335 from multiple layers of low refractive index material and the low refractive index layer 340 from a single low refractive index material.

Figure 4A:
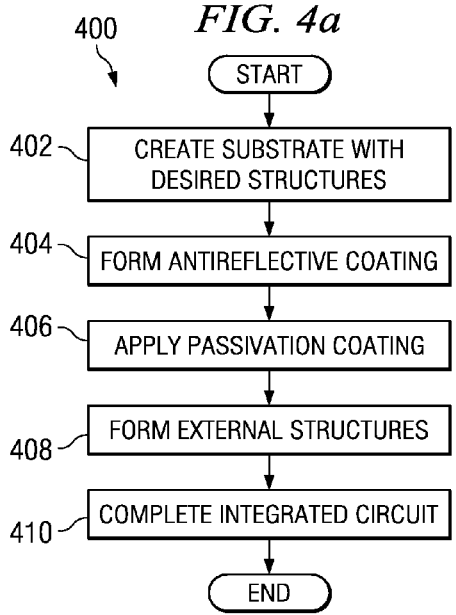
FIGS. 4a through 4c are diagrams of sequences of events in the fabrication of an integrated circuit with an antireflective coating, according to a preferred embodiment of the present invention.
Figure 4B:
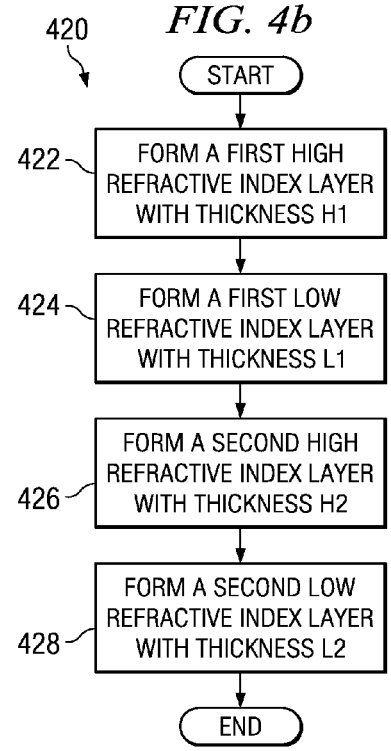
Figure 4C:
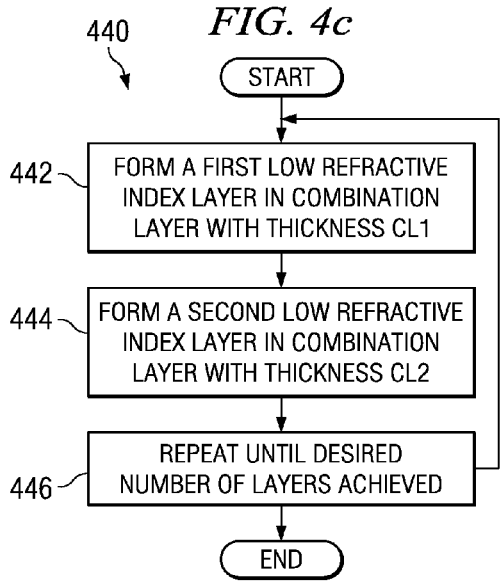

With reference now to FIGS. 4a through 4c, there are shown diagrams illustrating sequences of events in the manufacture of an integrated circuit, such as a light modulator array, with an antireflective coating for structures in a substrate of the integrated circuit, according to a preferred embodiment of the present invention. A sequence of events 400 in the manufacture of an integrated circuit, such as one containing a light modulator array, is shown in FIG. 4a. The diagram shown in FIG. 4a illustrates the sequence of events 400 in the manufacture of a typical integrated circuit and a sequence of events in the manufacture of an actual integrated circuit can vary for different integrated circuits.

Initially, the fabrication of the integrated circuit can begin with the formation of structures in a substrate of the integrated circuit (block 402). The structures formed in the substrate can include transistors, conductors, metal layers, vias, and so forth. Once the structures in the substrate of the integrated circuit have been formed, an antireflective coating can be formed (block 404). The antireflective coating can either be formed on the structures individually or it can be formed on a top surface of the substrate as a whole and cover all structures in the substrate as well as any portion of the substrate not containing a structure. After the antireflective coating has been formed on the substrate, a passivation coating can be applied (block 406). The passivation coating can be used to protect the substrate, the structures on and in the substrate, the antireflective coating, and so forth. Depending upon the antireflective coating, the passivation coating may not be needed. For example, if a top layer of the antireflective coating is formed from $SiO_2$ and has adequate thickness, then the passivation coating may not be required, since the passivation coating is typically made from $SiO_2$.

After the application of the passivation coating or the formation of the antireflective layer (if the passivation coating is not needed), external structures for the integrated circuit can be formed (block 408). For example, if the integrated circuit is a light modulator array making use of positional micromirrors, then support structures for the positional micromirrors, as well as the positional micromirrors, can be formed. Following the formation of external structures, any additional operations needed to complete the integrated circuit can be completed (block 410). The additional operations can include bonding wire pads together, forming electrodes, and so on. The integrated circuit is now complete and can undergo singulation, testing, labeling, packaging, and so forth.

The diagram shown in FIG. 4b illustrates a detailed sequence of events 420 in the formation of the antireflective coating on the substrate of the integrated circuit. The sequence of events 420 can be illustrative of the formation of an antireflective coating (block 404, FIG. 4a). The formation of the antireflective coating can begin with the formation of a first high refractive index layer (block 422). According to a preferred embodiment of the present invention, TiN can be used to create the first high refractive index layer. The first high refractive index layer can have a thickness, H1, as specified and illustrated previously. After forming the first high refractive index layer (block 422), a first low refractive index layer can be formed (block 424). The first low refractive index layer can serve as an antireflective coating for the first high refractive index layer. Preferred materials for use in the formation of the first low refractive index layer can be $SiO_2$ and SiON. However, materials with a refractive index ranging from that of air to that of TiN can be used. The first low refractive index layer can have a thickness, L1, wherein the thickness can range from 5 nm to 10,000 nm, with preferred thicknesses ranging from 10 nm to 2,500 nm.

A second high refractive index layer can now be formed on top of the first low refractive index layer (block 426). Again, TiN can be a preferred material for the creation of the second high refractive index layer. The second high refractive index layer can have a thickness, H2, in an application where the antireflective coating has four layers. Finally, a second low refractive index layer can be formed (block 428). Preferred materials for use in the formation of the first low refractive index layer can be $SiO_2$ and SiON. However, materials with a refractive index ranging from that of air to that of TiN can be used. The first low refractive index layer can have a thickness, L1, wherein the thickness can range from 5 nm to 10,000 nm, with preferred thicknesses ranging from 10 nm to 2,500 nm.

If the antireflective coating is to have more than four layers, the formation of the high refractive index layers and the low refractive index layers can continue, with a final layer of the antireflective coating being a low refractive index layer.

The diagram shown in FIG. 4c illustrates a detailed sequence of events 440 in the formation of a combination low refractive index layer of the antireflective coating. Each of the low refractive index layers in the antireflective coating (the first low refractive index layer and the second low refractive index layer, for example) can be formed from multiple layers of low refractive index materials. For example, the first low refractive index layer can be formed from alternating layers of $SiO_2$ and SiON. To form a multilayer low refractive index layer, a first layer can be formed with a thickness, CL1 (block 442), and then a second layer can be formed with a thickness, CL2 (block 444). Any additional layers can also be added to the low refractive index layer until a desired number of layers is achieved (block 446). Although the discussion illustrates the formation of the low refractive index layer from alternating layers of two low refractive index materials, more than two low refractive index layers can be used. The thicknesses of the alternating layers of low refractive index materials can be dependant upon factors such as desired color point, desired reflectivity, and so forth.

Figure 5A:
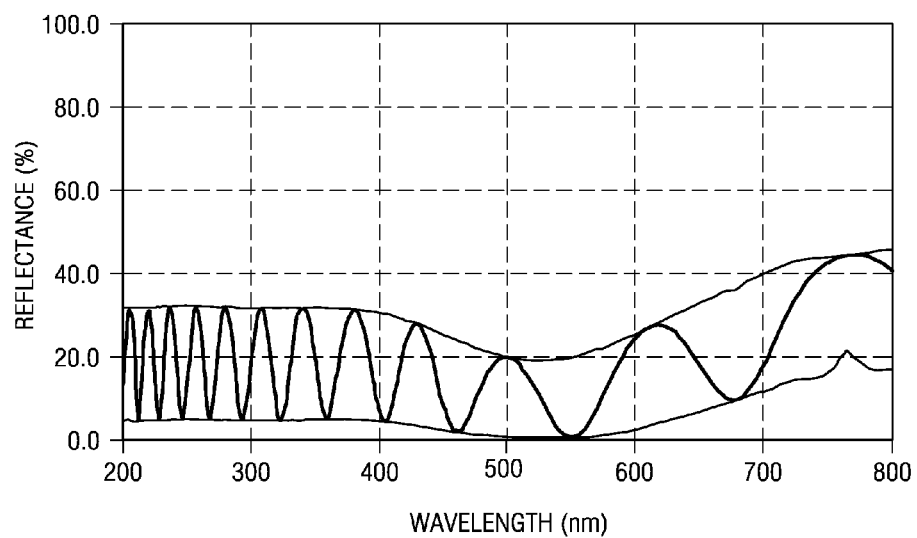
FIGS. 5a and 5b are diagrams of reflectance vs. light wavelength for a light modulator array with and without the antireflective coating, according to a preferred embodiment of the present invention.
Figure 5B:
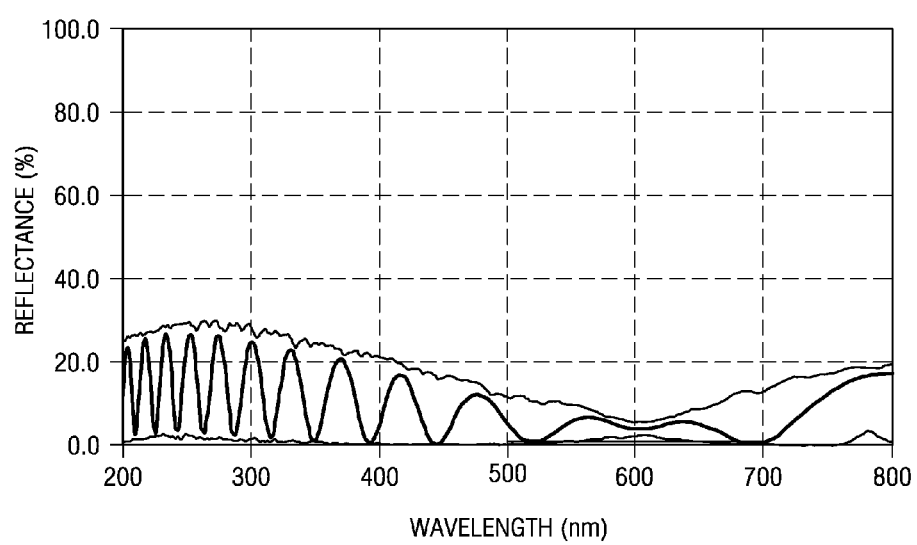

With reference now to FIGS. 5a and 5b, there are diagrams illustrating reflectance vs. light wavelength for exemplary light modulator arrays with and without the antireflective coating, according to a preferred embodiment of the present invention. FIG. 5a illustrates reflectance (in percentage) vs. light wavelength for a light modulator array without the antireflective coating. As shown in FIG. 5a, the reflectance can range from a low of about 20% to a high of about 45% for visible light spectrum (from 400 nm to 750 nm). FIG. 5b illustrates reflectance (in percentage) vs. light wavelength for a light modulator array with the antireflective coating. As shown in FIG. 5b, the reflectance ranges from a low of about 10% to a high of 22% for the visible light spectrum. The antireflective coating significantly reduces the reflectance of the light modulator array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A semiconductor device with an antireflective coating, the semiconductor device comprising:
    a first high refractive index layer overlying a reflective surface of an integrated circuit;
    a first low refractive index layer overlying the first high refractive index layer;
    a second high refractive index layer overlying the first low refractive index layer; and
    a second low refractive index layer overlying the second high refractive index layer, wherein one of the first and second high refractive index layers comprises $Ti_xN_yO_z$ with x, y, and z being integer values and y>x>z.

2. The semiconductor device of claim 1, wherein both the first and the second high refractive index layers comprise $Ti_xN_yO_z$ with x, y, and z being integer values and y>x>z.

3. The semiconductor device of claim 1, wherein a first material used in the first low refractive index layer has a refractive index between that of air and TiN and a second material used in the second low refractive index layer has a refractive index between that of air and TiN.

4. The semiconductor device of claim 3, wherein the first material and the second material are dielectric oxides selected from the group consisting of: silicon dioxide ($SiO_2$); silicon oxynitride (SiON); and aluminum oxide ($Al_2O_3$).

5. The semiconductor device of claim 3, wherein each of the individual refractive index layers have thicknesses between 3 nanometers and 10,000 nanometers.

6. The semiconductor device of claim 3, wherein each of the individual refractive index layers have thicknesses between 10 nanometers and 2,500 nanometers.

7. The semiconductor device of claim 1, wherein an other of the high refractive index layers comprises silicon rich nitride (SiRN).

8. The semiconductor device of claim 1, wherein at least one of the low refractive index layers comprises multiple combination layers of low refractive index materials.

9. The semiconductor device of claim 8, wherein the first low refractive index layer comprises a layer of $SiO_2$, and the second low refractive index layer comprises a first combination layer of SiON and a second combination layer of $SiO_2$.

10. The semiconductor device of claim 1, wherein the first low refractive index layer comprises a layer of $SiO_2$, and the second low refractive index layer comprises a layer of SiON.

11. The semiconductor device of claim 1, wherein a difference in a refractive index of a high refractive index material used in the first high refractive index layer and the second high refractive index layer and a refractive index of a low refractive index material used in the first low refractive index layer and the second low refractive index layer for light in the visible spectrum is at least 0.25.

12. The semiconductor device of claim 1, wherein an other of the high refractive index layers comprises a material selected from the group consisting of: conducting or semi-conducting metal, metal oxide, and metal nitride, wherein the material has a minimum refractive index of 1.7 for light in the visible spectrum.

13. The semiconductor device of claim 1, wherein the first low refractive index layer and the second low refractive index layer comprise a material selected from the group consisting of: one or more insulating metal oxides and metal halides, wherein the material has a maximum refractive index of 1.7 for light in the visible spectrum.

14. The semiconductor device of claim 1, wherein the refractive index layers are disposed only in certain areas of the device.

15. The semiconductor device of claim 1 further comprising a passivation layer overlying the second low refractive index layer.

16. The semiconductor device of claim 1, wherein both the first and the second high refractive index layers comprise $Ti_xN_yO_z$ with x, y, and z being integer values and y>x>z; and wherein the first and the second low refractive index layer each comprise a dielectric oxide.

17. The semiconductor device of claim 16, wherein the dielectric oxide is selected from the group consisting of: silicon dioxide ($SiO_2$); silicon oxynitride (SiON); and aluminum oxide ($Al_2O_3$).

18. The semiconductor device of claim 1 further comprising an array of spatial light modulators disposed over the second low refractive index layer.

19. An integrated circuit comprising:
    a first layer overlying integrated structures of the integrated circuit, the first layer comprising a first material with a high refractive index;
    a second layer overlying the first layer, the second layer comprising a second material with a low refractive index;
    a third layer overlying the second layer, the third layer comprising a third material with a high refractive index;
    a fourth layer overlying the third layer, the fourth layer comprising a fourth material with a low refractive index; and
    an array of spatial light modulators disposed over the fourth layer.

20. The integrated circuit of claim 19 further comprising a passivation layer overlying the fourth layer.

21. The integrated circuit of claim 19, wherein the spatial light modulators are digital micromirror devices.

22. The integrated circuit of claim 19, wherein the first and third materials each comprise titanium nitride; and wherein the second and third materials each comprise a dielectric oxide.

23. The integrated circuit of claim 22, wherein the titanium nitride has a composition of $Ti_xN_yO_z$, with x, y, and z being integer values and y>x>z.

24. The integrated circuit of claim 22, wherein the dielectric oxide is selected from the group consisting of: silicon dioxide ($SiO_2$); silicon oxynitride (SiON); and
    aluminum oxide ($Al_2O_3$).

* * * * *